INVENTORS.
Ralph V. Coles, Frederick L. Maltby and Dudley D. Nye.
BY
Their Attorney.

United States Patent Office 2,993,497
Patented July 25, 1961

2,993,497
ELECTROPNEUMATIC CONTROL SYSTEM FOR A VARIABLE CONDITION
Ralph V. Coles, Radnor, and Frederick L. Maltby, Philadelphia, Pa., and Dudley D. Nye, Riverton, N.J., assignors to Robertshaw-Fulton Controls Company, Richmond, Va., a corporation of Delaware
Filed Jan. 18, 1956, Ser. No. 559,897
4 Claims. (Cl. 137—85)

This invention relates generally to control mechanisms and more particularly to apparatus for transducing a signal capacitance, indicative of a physical quantity to be controlled, to a pneumatic signal with or without linear action.

The present invention comprises a capacity sensitive electromagnet circuit for converting a signal capacitance, indicative of a condition to be measured or controlled, into a mechanical movement, which, in the present invention is in the form of a pivoted beam. A nozzle associated with a pressure source and located adjacent the one end of the beam is adapted to cooperate with the beam, for varying the pressure in accordance with the movement of the beam with respect to the nozzle and the spacing therebetween. A pilot valve is arranged between the nozzle and the pressure source and is responsive to the variation in the pressure for delivering a pneumatic output in proportion to the pressure variation. The pilot valve is also adapted to control the flow of the fluid to a bellows for expanding the same in accordance with the pressure variation in the nozzle. The bellows is mechanically linked to a variable capacitor in the capacity-electromagnet circuit and serves to electrically balance the circuit after the unbalance thereof has been caused by the signal capacitance.

An object of the present invention is to transduce an impedance indicative of the condition to be measured and/or controlled into a corresponding pressure.

Another object of the invention is to convert a signal capacitance change into a corresponding pressure change having linear characteristics.

Figure 1:
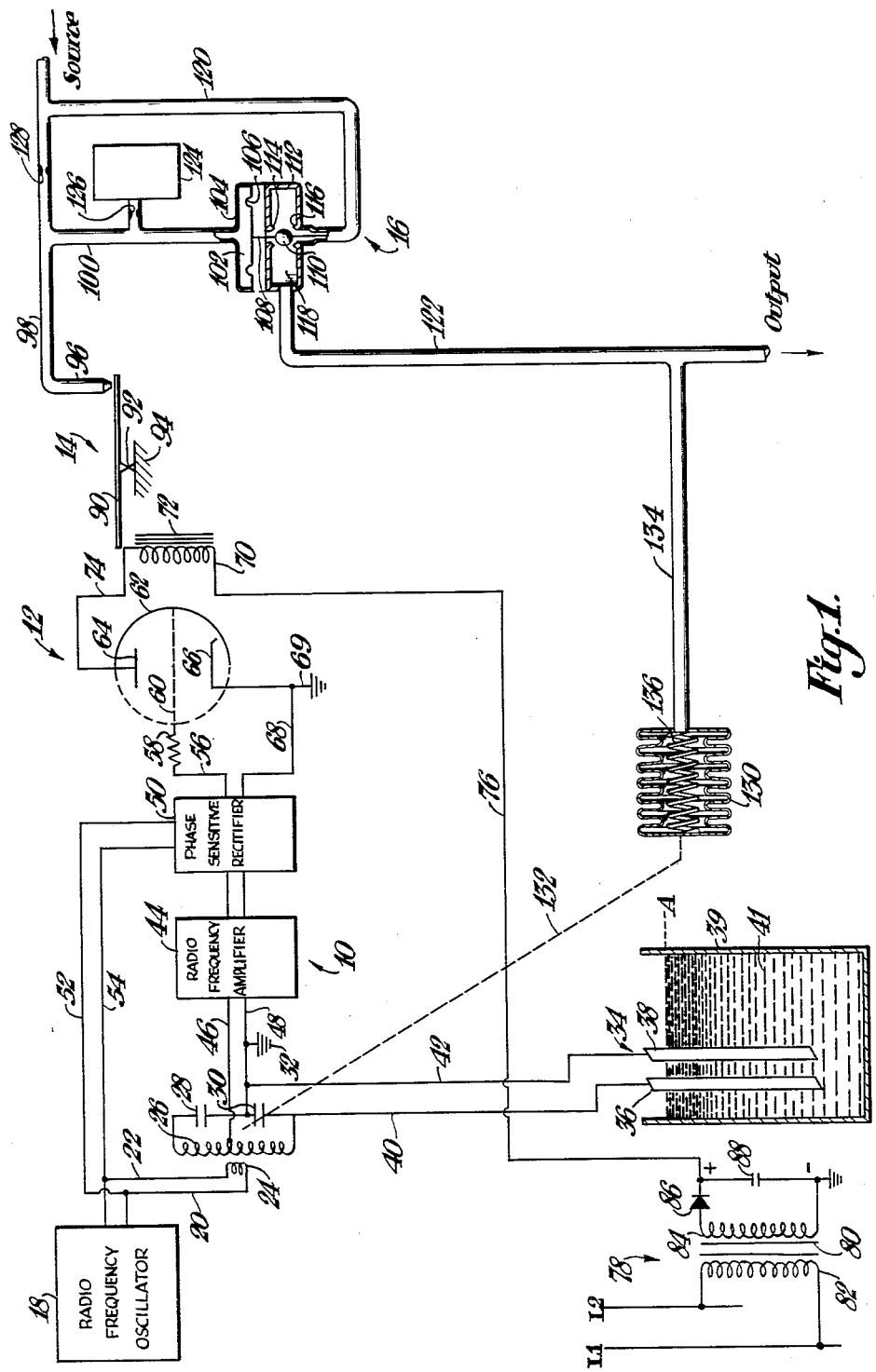
Figure 2:
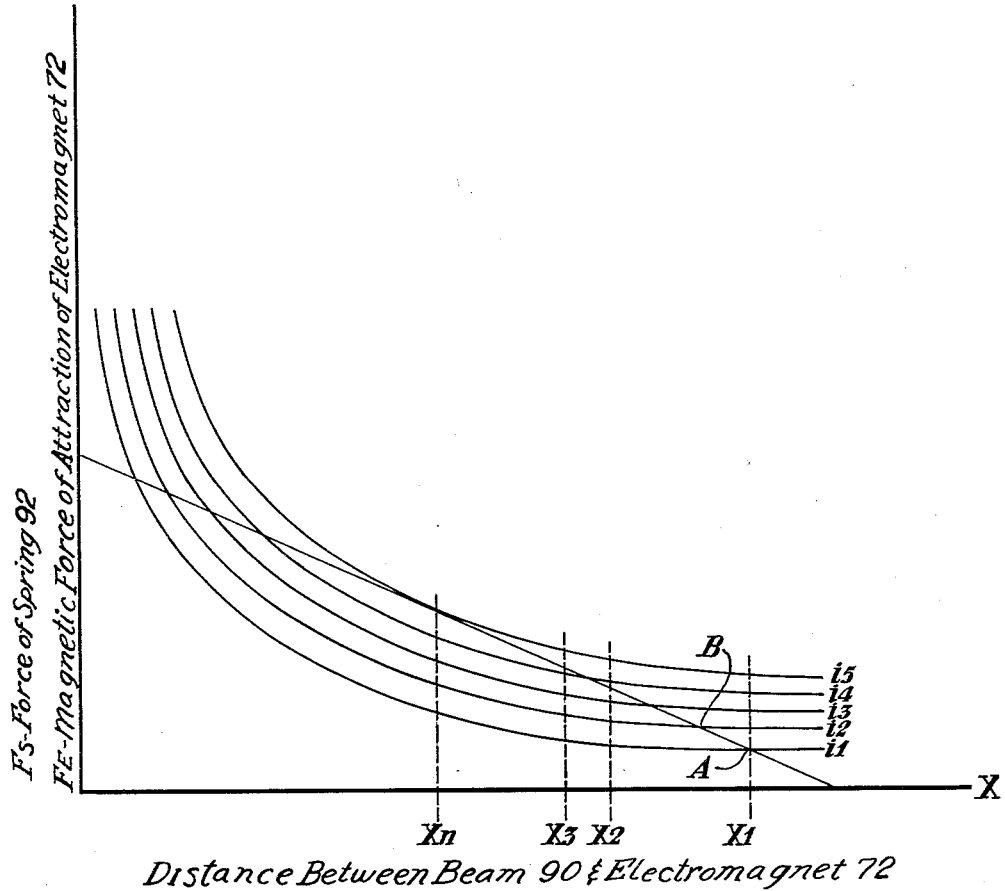

Other objects and advantages will become apparent from the following description taken in conjunction with the accompanying drawings wherein:

FIG. 1 is a diagrammatic view of a system embodying the essentials of the present invention; and FIG. 2 is a graph illustrating phases of energization of one of the elements of the present invention.

Referring more particularly to the drawings, the present invention comprises generally a capacity sensitive circuit 10, an electromagnet circuit 12 which is adapted to be energized by the circuit 10, a flapper-nozzle sensing mechanism 14 and a pneumatic pilot valve 16 operable in response to the variance in the pressure of a fluid in the nozzle flapper mechanism for controlling the condition.

The capacity sensitive circuit 10 utilizes a radio frequency oscillator 18 coupled by conductors 20, 22 and a coil 24 to a bridge circuit comprising a coil 26, a pair of variable capacitors 28 and 30 connected in series therewith, one side of the variable capacitor 30 being grounded at 32.

Completing the bridge circuit is a probe capacitor 34 connected in parallel with the capacitor 30 and which serves to sense a condition to be measured and/or controlled. The capacitor 34 may include a pair of plates 36, 38 connected to the capacitor 30 by conductors 40, 42, respectively, but may be of any desired construction which will effect a capacity variation in proportion to the condition variation. For purposes of illustration, the probe 34 is shown as disposed in a container 39 and immersed in a material 41 surrounding the same. In this arrangement, the present invention is adapted to measure and/or control the level of the material 41.

The unbalance signal of the bridge circuit is applied to the input of a radio frequency amplifier 44, also considered as part of circuit 10, by conductors 46 and 48. The capacity sensitive circuit 10 is completed by connecting the output of the R.F. amplifier 44 to the input of a phase sensitive rectifier 50. A reference signal is also supplied to the phase sensitive rectifier from the oscillator 18 by conductors 52 and 54.

It is apparent that the bridge circuit can be constructed to provide bridge balance when the capacitance of capacitor 28 is equal to the capacitance of capacitor 30 plus capacitor 34. When the capacitance of capacitor 28 is greater than the capacitance of capacitor 30 plus capacitor 34 an unbalance results and an R.F. signal is impressed on the input of the radio frequency amplifier 44. The amplifier signal at the output of the R.F. amplifier 44 is then applied to the phase sensitive rectifier 50 resulting in a D.C. voltage at the output terminals of the rectifier 50. Should the capacitance of the capacitor 28 be less than the capacitance of capacitor 30 plus capacitor 34 the R.F. voltage between conductors 46 and 48 is shifted in phase by 180° resulting in a reversal in the polarity of the D.C. voltage at the output terminals of the rectifier 50 due to the phase sensitive action of the rectifier 50.

One output terminal of the rectifier 50 is connected by a conductor 56 through a resistor 58 to the grid 60 of a discharge tube 62, having an anode 64 and a cathode 66. The other output terminal of the rectifier 50 is connected by a conductor 68 to the cathode 66 which is grounded at 69.

The output of the phase sensitive rectifier 50 serves to apply a potential upon the grid 60 in accordance with the amplitude of the R.F. unbalanced signal appearing at the input terminals of the amplifier 44. The resistor 58 prevents the grid to cathode voltage of the tube 62 from ever going appreciably positive when the output of the phase sensitive rectifier 50 causes the conductor 56 to become positive with respect to conductor 68. The opposite side of bridge balance in the circuit 10 will however produce a negative bias on the grid 60 and thus affect the flow of plate current in the tube 62.

An exciter coil 70 of an electromagnet 72 is connected to the anode 64 of the tube 62 by a conductor 74 to be energized thereby when the tube 62 is conducting. The coil 70 is also connected by a conductor 76 to the output of a conventional D.C. power supply 78 comprising a transformer 80 having a primary coil 82, secondary coil 84, a rectifier 86 and a filter capacitor 88.

As will presently appear, the exciter coil 70 is adapted to be energized by direct current and at various values depending upon the capacitance between the plates 36, 38. The electromagnet 72 may be of the conventional type wherein the attractive force thereof is proportional to the square of current energizing the exciter coil. The electromagnet 72 when energized is adapted to attract one end of a beam 90 pivotally mounted intermediate the ends thereof by a relatively stiff spring flexure 92 secured to a suitable support 94. The flexure 92 may be of any suitable construction which is adapted to resist continual flexing thereof in proportion to a force for deflecting the same. In operation, the electromagnet 72 will attract the adjacent end of the beam with a force proportional to small increases in current in the coil 70. The flexure 92 will resist this attraction but will flex until the tension thereof is equal to and opposite the force of attraction of the coil 70, in which event, the adjacent end of the beam 90 will occupy a new position somewhat closer to the electromagnet 72. An increase in the current in the coil 70 will move the beam 90 closer thereto until the force resisting such movement balances the attractive force caused by the increased current. Similarly, any value of the current in the coil 70, within a workable range, will deflect the beam 90 and cause the same to remain stationary for that value.

The other end of the pivotal beam 90 is located in flow controlling association with a nozzle 96 as determined by the force of attraction exerted on the end of the beam 90 adjacent to the electromagnet 72 by the coil 70. The nozzle 96 has a conduit 98 leading thereto for supplying a pneumatic flow to the nozzle 96 from a suitable source of fluid under pressure. It will be apparent that as the beam 90 is rotated in a counterclockwise direction, the same will approach the tip of the nozzle 96 to restrict flow therethrough and, consequently increase the fluid pressure within the conduit 98. Conversely, a clockwise rotation of the beam 90 will increase the gap between the tip of the nozzle 96 and the beam 90 to decrease the fluid pressure in the conduit 98.

The conduit 98 is connected by a pipe 100, adjacent to the nozzle 96, for communication with a chamber 102 defined by a cup-shaped support 104 and a diaphragm 106 secured across the open end thereof. Centrally connected to the diaphragm 106 is a rod 108 which serves to transmit the force exerted by the pressure in the chamber 102 on the diaphragm 106 to a ball-shaped valve member 110 of a bleed-type pilot valve 112. The valve member 110 may be secured to the rod 108 by any suitable means and is adapted to cooperate with a pair of oppositely disposed valve seats 114, 116, located in the valve 112.

The valve seat 116 is interposed between the chamber 118 formed in the valve 112 and a pipe 120 connecting the chamber 118 with the fluid pressure source. The valve seat 114 is interposed between the chamber 118 and the atmosphere for permitting the fluid to bleed into the atmosphere when the valve member 110 is moved away from the seat 114. An output pipe 122 is connected to the valve 112 and is in communication with the chamber 118 for directing the flow of fluid to a control mechanism such as a pneumatic valve (not shown) for controlling the condition to be controlled as sensed by the probe and capacitor 34. To complete the pneumatic system, a compensating capacity tank 124 is connected to the pipe 100 between the nozzle 96 and the chamber 102. A restriction 126 is positioned between the pipe 100 and the interior of the tank 124, and a second restriction 128 is positioned within the conduit 98 between the connection thereof with the pipe 100 and the fluid pressume source.

A feedback mechanism is arranged to automatically balance the bridge section of the oscillator circuit 10 and stabilize the output pressure and takes the form of a relatively thin walled bellows 130 having a mechanical linkage 132 connected to the variable capacitor 30 for varying the same during expansion and contraction of the bellows 130. A conduit 134 connects the output pipe 122 to the bellows 130 for conveying fluid pressure to the interior of the bellows 130 when the valve member 110 is moved away from the seat 116 and to exhaust the fluid pressure when the valve seat 114 is unseated. A spring 136 is positioned in the bellows 130 and held in tension between the end walls thereof for maintaining the bellows 130 within its working limits and to eliminate the hysteresis effect of the bellows during actuation of the same.

Referring to FIG. 2, the force of attraction $F_E$ of the coil 70 is shown plotted as a function of the gap X between the coil 70 and the adjacent end of the beam for various values of current $i_1$, $i_2$, $i_3$, $i_4$, $i_5$, in the coil 70. As shown in FIG. 2, the force $F_s$ exerted by the spring 92 as a function of the gap X is superimposed on the graph. At point A, the force exerted by the spring 92 equals that exerted by the coil 70 when the same is induced with a current $i_1$. Under these conditions, the beam 90 will assume a balanced condition at a distance $X_1$, away from the coil 70. If the current is increased, say to the value $i_2$, a new point of equilibrium B is taken up by the beam 90, a distance $X_2$ from the coil 70. Similarly, this phenomena will occur for various values of the current indicated and fractional values thereof, within certain working limits of the current. For each value of current, within these limits, the flexure 92 will equal the force of attraction exerted by the coil 70 thereby positioning the adjacent end of the beam in accordance with the current flowing in the coil 70.

For purposes of efficiency, the available range of values is indicated between $X_1$ and $X_n$ and the present invention is adapted to produce an output pressure of 3–15 p.s.i. while only working within the range of gap values indicated between $X_2$ and $X_3$. In this manner, the distortion at the extreme ends of the working range $X_1$–$X_n$ is avoided. To accomplish this, smaller increments of current values, below and above the value $i_4$, are utilized to control the full deflection of the beam 90 for producing an output pressure of 3–15 p.s.i. External changes may cause current or voltage variations in the system or internal temperature changes in the system may cause structural variations in spring 92, beam 90 or the electromagnet 72 with consequential balance of beam 90 at a different distance X than may normally be expected. As a result of these changes and dependent upon whether they are in the order of an increase or a decrease, the range of working values $X_2$—$X_3$ will shift slightly to the right or left from the position indicated in FIG. 2 but without departing from the available working range $X_1$–$X_n$.

While the values of the circuit elements shown in the drawing are not critical, the values listed in the following table for the various elements have proved satisfactory:

Resistance of the resistor 58_____ 1 megohm.
Capacity of the capacitor 28___ 140 micromicrofarads (variable).
Capacity of the capacitor 88_____ 16 microfarads.
Electromagnet coil 84_____ 3000 ohms.

*Operation*

Assuming that the fluid level of the material 41 surrounds the plates 36, 38 at the desired high level A and that the beam 90 is in a balanced condition, then the power supply 78 will furnish a constant direct current to the coil 70. The sources of pneumatic pressure, at approximately 18 to 20 p.s.i., will furnish a steady flow of fluid to the nozzle 96 so that the apparatus is conditioned for a capacitance change between the plates 36, 38 of the probe 34.

In this condition of the apparatus, the total capacitance of the capacitors 30 and 34 approximately equals the capacitance of the capacitor 28 so that the bridge circuit is balanced for all practical purposes. The circuit 10 will experience minimum R.F. voltage amplitude at its input resulting in maximum conduction through the tube 62 and the anode circuit thereof. With a current flowing in the anode circuit of the tube 62, the electromagnet 72 will be energized thereby attracting the adjacent end of the beam 90, and, since the current is at its maximum value, the beam 90 will have rotated in a counterclockwise direction to one extreme of its working range, which for purposes of this invention is a few thousandths of an inch.

Counterclockwise rotation of the beam 90 moves the end thereof closer to the tip of the nozzle 96 thereby increasing the pneumatic pressure in the conduit 98. This increased pneumatic pressure in the conduit 98 is conducted by the pipe 100 to the chamber 102 where it is applied to the diaphragm 106. Since the penumatic pressure in the chamber 102 is increased, the diaphragm 106 will flex downwardly, as viewed in the drawing, and cause the rod 108, carried thereby, to impart movement to the valve member 110 away from the valve seat 114 and upon the valve seat 116 for preventing the flow of fluid from the source to the output tube 122. Upon this occurrence, the fluid pressure in the bellows 130, under tension of the spring 136, will bleed past the valve seat 114 to the atmosphere thus reducing the output pressure within the tube 122 and the pressure within the bellows 130 to a minimum. Contraction of the bellows 130 will have varied the capacitance of the capacitor 30 such that the total capacity of the capacitors 30, 34 now approximately equals the capacity of the capacity 28. The apparatus is thus in equilibrium as previously assumed.

In the event the level of the material 41 falls below the level A, the R.F voltage amplitude applied to the amplifier 44 will increase due to the decreased capacitance of the plates located in the fluid causing a corresponding increase in negative grid bias on the tube 62 via the phase sensitive rectifier 50. This negative voltage will cause beam rotation in a clockwise direction under the bias of the flexure 92. The clockwise rotation of the beam 90 increases the gap between the same and the nozzle 96 thereby decreasing the pressure within the conduit 98 in the chamber 102. The rod 108 will then move upwardly to disengage the valve member 110 from the valve seat 116 and permit the flow of fluid to the chamber 118 and through the output pipe 122. This flow of fluid in the pipe 122 increases the pressure therein and may be utilized to control the flow of fluid into the container 39, or to indicate the level of the material 41, or both.

The increase of pressure in the pipe 122 will be transmitted to the bellows 130 expanding the same for increasing the capacitance of the capacitor 30. This, in effect, will rebalance the bridge circuit in accordance with the level of the material thus establishing a pressure in the output pipe 122 in proportion to the level of the material.

In the event the level of the material 41 falls, the capacitance between the plates 36, 38 will decrease to unbalance the bridge circuit and increase the amplitude of the R.F. voltage applied to the amplifier 44 resulting in the increase of the gap between the nozzle 96 and the beam 90 whereupon the pressure in the chamber 102 is decreased. More fluid is then permitted to enter the chamber 118 and the output pressure in the pipe 122 is increased for controlling purposes such as increasing the flow of material into the container 39.

It will be obvious from the foregoing, that the apparatus is arranged so that when the level of the material 41 is highest, the output pressure in the pipe 122 is at a minimum and therefore is in a non-controlling condition with respect to the flow of material in the container 39. With the level of the material at its highest point, the capacitance between the plates 36, 38 is at a maximum and therefore the capacitor 30 is preadjusted for minimum capacitance. In this manner, the bellows 136 is adapted to linearly adjust the capacity of the capacitor 30 from the minimum value to a greater value as the capacitance between plates 36, 38 decreases due to the level of the material receding.

As previously stated, the R.F. bridge is balanced when the sum of the capacitance of the capacitors 30 and 34 is equal to the capacitance of the capacitor 28. When the level of the material 41 rises or falls, there is a momentary change in the balance condition of the R.F. bridge circuit resulting in the output pressure automatically changing to a new value so as to bring the bridge back to essentially the same condition of balance by way of the bellows 130 and capacitor 30. The variation of this condition of bridge balance over the workable range of output pressure variation is kept extremely small or negligible by utilizing a high gain R.F. amplifier circuit and an electromagnet circuit with large D.C. voltage to nozzle pressure conversion sensitivity.

Should the output pressure be utilized to control the flow of material into the container 39 the level of material will tend to return to the original value after a disturbance, providing that an increase of output pressure increases the flow of material into the container. The degree to which the level returns to its original value depends on the controlling proportional band or the probe capacitance to output pressure conversion sensitivity. This proportioning band is determined by the range of capacitance variation of the capacitor 30. The control point may be adjusted by means of the capacitor 28.

In normal operation, when the level of the material 41 is at point A and is stationary, that is, the material is not being exhausted from the container 39, the pressure output will be constant, and as previously stated, for purposes of this invention, will be at a minimum. In addition, the R.F. bridge will be balanced, and the beam 90 will remain stationary to maintain the above referred to constant minimum. If the material is being used, that is, drawn from the container 39, the unbalance of the bridge circuit will result in a pressure output from the pipe 122 that may be constant or variable depending upon the manner in which the material is drawn from the container. If the level of material recedes to a constant value, the pressure output will go up to a constant value and the beam 90 will be at a new position so as to maintain the pressure, which may be utilized to provide a controlling influence on the level of the material. In any event, the apparatus will assume a condition of equilibrium after disturbance of the level of the material in the container.

It will be apparent that the reverse of this operation may be readily available by reversing the action of the pilot valve 104 and the linkage 132. In this case a decrease of level will decrease the output pressure.

The present invention is stabilized against sudden pressure variations from the source as by the compensating network 124 and the restrictions 126, 128. Any sudden build-up of pressure in the conduit 98 will cause leakage of the fluid through the restriction 126 into the tank 124 thus bleeding out a portion of the fluid in the system and allowing a steady and relatively slow increase of the pressure build-up. Similarly, any sudden decrease in the pressure will permit the slow escape of the fluid from the tank 124 into the conduit 98 to slow down the decrease of the pressure.

The compensating tank 124 also serves the purpose of allowing the electronic circuit and the sensing device, comprising the beam 90 and the nozzle 96 to be made highly sensitive without affecting the stability of the system. By proper dimensioning of the nozzle 96 and the gap between the same and the beam 90, the sensing ability of these elements can be greatly increased and any tendency for self-oscillation of the apparatus will be suppressed by the action of the restrictions 126, 128 and the tank 124.

From the foregoing it will be apparent that the steady state output pressure in conduit 122 will be proportional to the level of material in the tank 41 and that the proportioning band can be set at any desired value by the range of capacitance variation available to the capacitor 30. It is also apparent that the position of the proportioning band relative to tank 41 can be placed at any desired level by adjusting the capacitor 28. It will be apparent to those skilled in the art that many modifications of the disclosed embodiment of the invention may be made without departing from the scope thereof which is to be measured by the appended claims.

We claim:

1. An electrical-pneumatic apparatus for producing an output fluid pressure which varies with changes in a condition, the combination comprising an electrical circuit having an output and first and second impedance elements, said output varying in response to changes in said first and second impedance elements, said first impedance element varying in response to changes in a condition; a first conduit for connection to a source of fluid pressure; an electrically operated valve means controlled by said output to alter the fluid pressure in said first conduit; a housing having a chamber with an input opening, an exhaust opening, and an output opening; a second conduit for connecting said input opening to said source of fluid pressure; means responsive to fluid pressure in said first conduit for controlling fluid flow through said input and exhaust openings to alter the pressure at said output opening; mean connected to said first conduit intermediate said valve means and said fluid flow control means to reduce the rate of change of fluid pressure in said first conduit acting on said fluid flow control means; and means responsive to the fluid pressure of said output opening to vary said second impedance element to cause the output of said electrical circuit to change in the direction opposite to the change caused by said first impedance element.

2. An electrical-pneumatic apparatus for producing an output fluid pressure which varies with changes in a condition, the combination comprising an electrical circuit including a bridge circuit, said electrical circuit having an output which varies in response to the output of said bridge circuit; an impedance branch in said bridge circuit having a first and second impedance element, said first impedance element varying with changes in the condition to alter the output of said bridge; a first conduit for connection to a source of fluid pressure; an electrically operated valve means controlled by said electrical circuit output to alter the fluid pressure in said first conduit; a housing having a chamber with an input opening, an exhaust opening, and an output opening; a second conduit for connecting said input opening to said source of fluid pressure; means responsive to the fluid pressure in said first conduit for controlling fluid flow through said input and exhaust openings to alter the pressure at said output opening; and means responsive to the fluid pressure at said output opening to vary said second impedance element to alter the output of said bridge circuit in the direction opposite to the change caused by said first impedance element.

3. An electrical-pneumatic apparatus for producing an output fluid pressure which varies with changes in a condition, the combination comprising an electrical circuit including a bridge circuit, said electrical circuit having an output which varies in response to the output of said bridge circuit; an impedance branch in said bridge circuit having a first and second impedance element, said first impedance element varying with changes in the condition to alter the output of said bridge; a first conduit for connection to a source of fluid pressure; an electrically operated valve means controlled by said electrical circuit output to alter the fluid pressure in said first conduit; a housing having a chamber with an input opening, an exhaust opening, and an output opening; a second conduit for connecting said input opening to said source of fluid pressure; means responsive to the fluid pressure in said first conduit for controlling fluid flow through said input and exhaust openings to alter the pressure at said output opening; means connected to said first conduit intermediate said valve means and said fluid control means to reduce the rate of change of fluid pressure in said first conduit acting on said fluid flow control means; and means responsive to the fluid pressure at said output opening to vary said second impedance element to alter the output of said bridge circuit in the direction opposite to the change caused by said first impedance element.

4. In an electrical-pneumatic apparatus for producing an output fluid pressure which varies with changes in a condition, the combination comprising an electrical circuit having an output and first and second impedance elements, said output varying in response to changes in said first and second impedance elements, said first impedance element varying in response to changes in a condition; a first conduit for connection to a source of fluid pressure; an electrically operated valve means controlled by said output to alter the fluid pressure in said first conduit; a housing having a chamber with an input opening, an exhaust opening, and an output opening; a second conduit for connecting said input opening to said source of fluid pressure; means responsive to fluid pressure in said first conduit for controlling fluid flow through said input and exhaust openings to alter the pressure at said output opening; means including a capacity tank and a series connected restriction connected to said first conduit intermediate said valve means and said fluid flow control means to reduce the rate of change of said fluid pressure in said first conduit acting on said fluid flow control means; and means responsive to the fluid pressure of said output opening to vary said second impedance element to cause the output of said electrical circuit to change in the direction opposite to the change caused by said first impedance element.

References Cited in the file of this patent

UNITED STATES PATENTS

| | | |
|---|---|---|
| 2,019,328 | Thompson et al. | Oct. 29, 1935 |
| 2,188,628 | Freystedt | Jan. 30, 1940 |
| 2,310,298 | Kuhl et al. | Feb. 9, 1943 |
| 2,501,583 | Schafer | Mar. 21, 1950 |
| 2,523,198 | Davies | Sept. 19, 1950 |
| 2,530,619 | Kliever | Nov. 21, 1950 |
| 2,601,867 | Alyea | July 1, 1952 |
| 2,633,858 | Eckman | Apr. 7, 1953 |
| 2,657,341 | Covert et al. | Oct. 27, 1953 |
| 2,658,392 | Vannah | Nov. 10, 1953 |
| 2,662,540 | Rutherford | Dec. 15, 1953 |
| 2,688,875 | De Bloisblanc et al. | Sept. 14, 1954 |
| 2,727,992 | Wilson | Dec. 20, 1955 |
| 2,743,403 | Wernlund | Apr. 24, 1956 |
| 2,766,731 | Brandes | Oct. 16, 1956 |
| 2,769,338 | Hermanson | Nov. 6, 1956 |
| 2,782,346 | Darling | Feb. 19, 1957 |
| 2,787,710 | Van Tol | Apr. 2, 1957 |
| 2,800,913 | Swartwout et al. | July 30, 1957 |
| 2,800,914 | Side | July 30, 1957 |
| 2,804,877 | Rosenberger | Sept. 3, 1957 |
| 2,866,336 | Hitchcox | Dec. 30, 1958 |
| 2,874,570 | Bergeson | Feb. 24, 1959 |
| 2,915,695 | Zimmerli | Dec. 1, 1959 |

FOREIGN PATENTS

| | | |
|---|---|---|
| 1,096,531 | France | June 21, 1955 |